(12) United States Patent
Chang

(10) Patent No.: US 6,765,727 B1
(45) Date of Patent: Jul. 20, 2004

(54) BEAM COMBINER

(75) Inventor: Sean Chang, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 10/465,446

(22) Filed: Jun. 18, 2003

(30) Foreign Application Priority Data

Jan. 27, 2003 (TW) .................................. 92201513 U

(51) Int. Cl.[7] .......................... G02B 27/14; G02B 27/10
(52) U.S. Cl. ..................... 359/630; 359/618; 359/640
(58) Field of Search ......................... 359/618, 629–633, 359/639, 640

(56) References Cited

U.S. PATENT DOCUMENTS

| 5,198,928 A | * | 3/1993 | Chauvin ..................... 359/465 |
| 6,493,148 B1 | * | 12/2002 | Anikitchev ................. 359/634 |
| 6,704,144 B2 | * | 3/2004 | Huang ........................ 359/634 |
| 2003/0218952 A1 | * | 11/2003 | Katayama et al. ....... 369/53.26 |

* cited by examiner

Primary Examiner—Huy Mai
(74) Attorney, Agent, or Firm—Pro-Techtor International Services

(57) ABSTRACT

A beam combiner includes a heat-dissipation element and a plurality of prisms. Each of the prisms is applied with a high-reflection coating for forming a reflective surface, and is connected to the heat-dissipation element via the reflective surface.

16 Claims, 5 Drawing Sheets

BEAM COMBINER

BACKGROUND OF THE INVENTION (a) Field of the invention

The invention relates to a beam combiner, and more particularly, to a beam combiner having a high heat-dissipation rate and capable of precisely positioning its members during assembly.

(b) Description of the Related Art

Referring to FIG. 1, a prior beam combiner 100 includes prisms 102, light guides 104 and 106, light sources 108 and reflectors 110. When light emitted from the light sources 108, positioned at opposite sides of the beam combiner 100, directly enters or has been reflected by the reflectors 110 and then enters the light guide 104, it is further directed into the prisms 102 where light is reflected by different surfaces of the prisms and is finally collected in the light guide 106. Thus, a beam combining effect for guiding light emitted from various light sources toward the same output direction is obtained.

In order to acquire the aforesaid beam combining effect, the traveling routes of the input light in the prisms 102 shall follow the optical paths as indicated in FIG. 1. Under the circumstance, end surfaces 104A of the light guides 104 shall not be in contact with input surfaces 102A of the prisms 102. That is, a clearance is necessarily maintained in order to accommodate other media such as air, and thus where, a interface 102A between two media having different refractive index, the total reflection may occur. Hence, when light traveling in the prisms 102 strikes the medium with lower refractive index such as air at any angle greater than its critical angle, the total reflection occurs at the interfaces 102A and light can be reflected to the same direction.

In a prior method, the end surfaces 104A of the light guides 104 adhere to the input surfaces 102A, such that an adhesive would serve as the medium having lower refractive index compared with that of the prism. In another prior method, a supporting member (not shown in the figure) is utilized for directly positioning the prisms 102 and the light guides 104 to further maintain the air clearance 112.

However, heat produced by the high power light sources 108 is prone to deteriorate the adhesive quality and results in the prisms 102 and the light guides 104 unsatisfactory positioning. Furthermore, by using the adhesive for connecting the input surfaces 102A and the end surfaces 104A of the light guides 104, a portion of light tends to escape form the connection surfaces of the adhesive and thus reducing the light coupling efficiency. Also, the space taken up by the beam combiner assembly will be significantly increased if a supporting member is utilized for maintaining the air clearance 112 between the prisms 102 and the light guides 104.

SUMMARY OF THE INVENTION

Therefore, an object of the invention is to provide a beam combiner capable of precisely positioning its members and efficiently dissipating heat produced by the light source.

According to the invention, a beam combiner includes a heat-dissipation element and a plurality of rectangular prisms. Each of the prisms is applied with a high-reflection coating for forming a reflective surface, and the prisms are connected to the heat-dissipation element via the reflective surfaces having the high-reflection coatings.

Since the heat-dissipation element is designed to fix the prisms via connecting the reflective surfaces, the occurrence of total reflection is thus ensured by the precise positioning of the prisms keeping in contact with the air medium. As a result, light leak caused by the prisms coming into contact with the light guides or other elements is prevented, and an additional supporting member for positioning the light guides is not required. Besides, the heat-dissipation element having high thermal conductivity is capable of rapidly dissipating heat in the high-reflection coatings, and thus production costs can be reduced because high-quality coatings needed for the endurance of high temperature are no longer required.

DETAILED DESCRIPTION OF THE PREFERRED EMBODIMENTS

Figure 1:
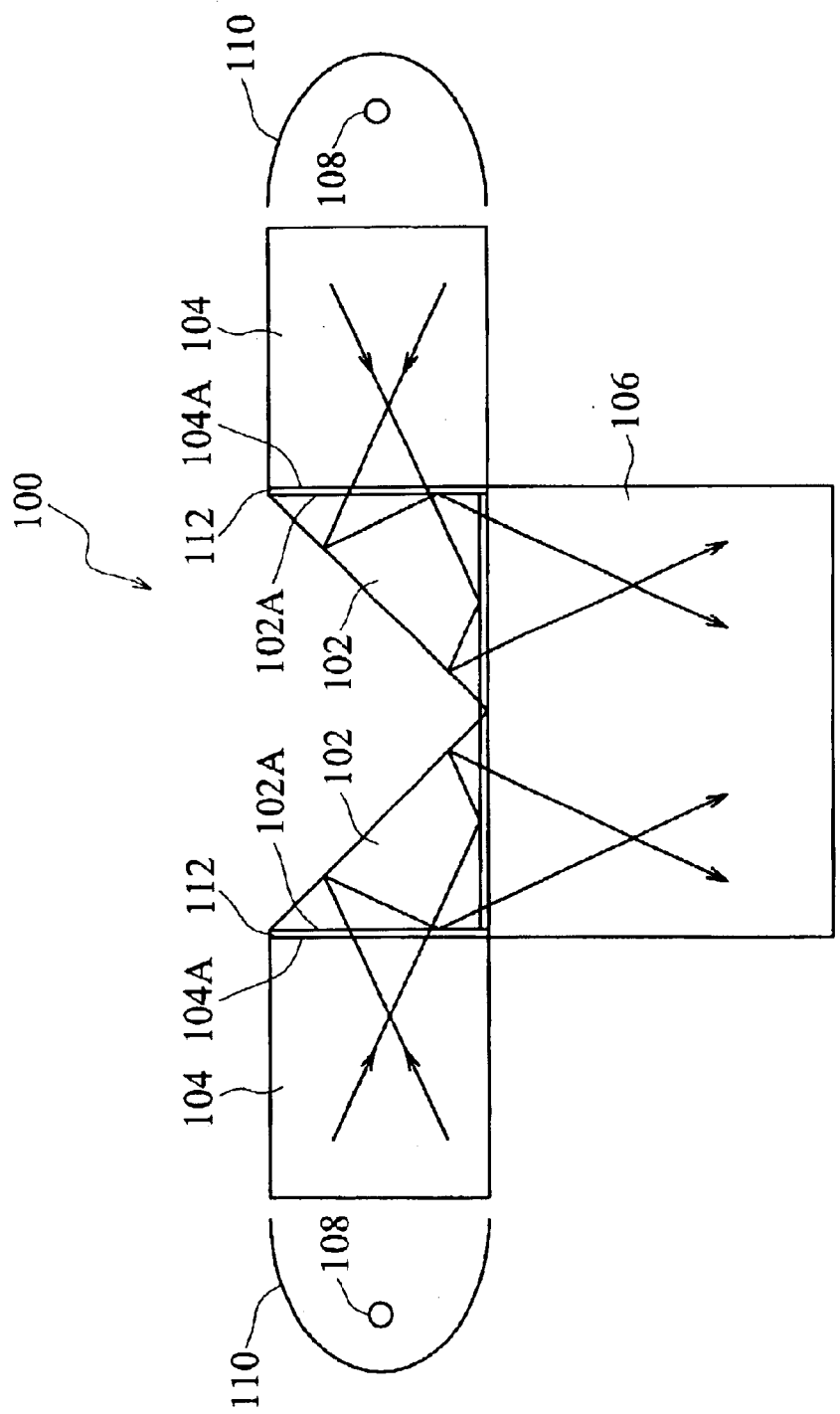
FIG. 1 shows a schematic view of a beam combiner according to the prior art.
Figure 2:
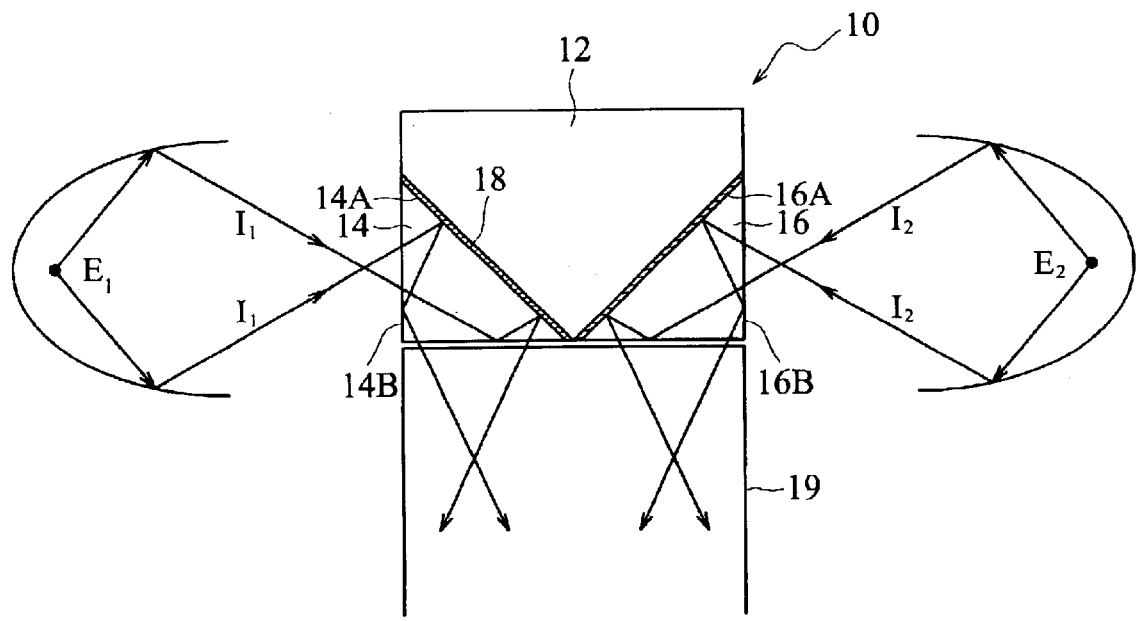
FIG. 2 is a schematic view showing an embodiment of a beam combiner according to the invention.

FIG. 2 is a schematic view showing an embodiment of a beam combiner.10 according to the invention. The beam combiner 10 includes a heat-dissipation element 12, a prism 14 and a prism 16. In the embodiment, the prisms 14 and 16 are preferably rectangular prisms, and each surface of the prisms is polished to form a smooth surface.

Referring to FIG. 2, an inclined plane of each of the prisms 14 and 16 is applied with a high-reflection coating 18 such as aluminum, titanium or dielectric coating, for forming reflective surfaces 14A and 16A. The heat-dissipation element 12 is made of materials having high thermal conductivity such as metals like copper. The prisms 14 and 16 are connected to the heat-dissipation element 12 via the reflective surfaces 14A and 16A having high-reflection coatings, thus constructing the beam combiner 10 according to the invention.

The method for connecting the reflective surfaces 14A and 16A to the heat-dissipation element 12 is not limited. For instance, such connection may be carried out by the prisms 14 and 16 adhering to the dissipation element 12, or by soldering or fusing a metal coating, formed in advance on the reflective surfaces 14A and 16A, to the heat-dissipation element 12.

Referring to FIG. 2, input light beam $I_1$ emitted from the light sources $E_1$ and beam $I_2$ from light sources $E_2$ both enter the beam combiner 10 by its two sides, surfaces 14A and 16A of the prisms 14 and 16. After that, because the total reflection occurred in the interface between the prisms and the air medium, and the reflective surfaces 14A and 16A have high-reflection coatings, the input light beams $I_1$ and $I_2$ are guided toward the same output direction, thereby acquiring the beam combining effect. Further, in the embodiment, a light guide 19 is positioned on the output direction of the light, so as to receive and evenly distribute the collected light beams to an application system such as a projector. The light guide 19 may either be a solid or a hollow light guide.

Figure 3:
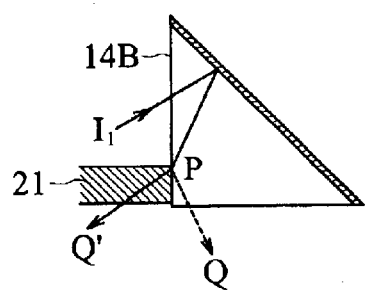
FIG. 3 shows a schematic view illustrating light leak resulting from poor positioning of the prisms.

To achieve the aforesaid beam combining effect, all surfaces of the prisms 14 and 16 except for the reflective surfaces applied with high-reflection coatings must stay in contact with the air medium in order to make total reflection occur. Hence, positioning of the rectangular prisms 14 and 16 becomes a crucial task. FIG. 3 is a schematic view showing a leak of light resulting from poor positioning. Referring to FIG. 3, when the prisms are not properly positioned, they come into contact with other members 21 such as light guides so that the input light beams $I_1$ designed to reflect from point P to point Q deviate and leak toward a direction of point Q' instead.

It is considered that only the surfaces 14A and 16A having high-reflection coatings need not contact with the air medium. For that reason, according to the invention, the heat-dissipation element 12 is designed to fix the prisms 14 and 16 via connecting the reflective surfaces 14A and 16A, and the occurrence of total reflection is thus ensured by the precise positioning of the prisms keeping in contact with the air medium. It is then unnecessary to produce a clearance by constructing relative positions of the prisms and light guides as in the prior method. As a result, light leak caused by the prisms coming into contact with the light guides or other elements as shown in FIG. 3 is prevented. Furthermore, it is easy to launch the operations for incorporating the beam combiner 10 into any application systems by holding one end of the heat-dissipation element 12 during assembly.

In a beam combiner having combinations of different light sources, heat produced by the high power light sources is prone to deteriorate the quality of the high-reflection coatings 18, and thus an issue such as the high-reflection coating peeling off from the prism due to thermal stress is arisen. Therefore, according to the invention, the aforesaid issue is prevented because the heat-dissipation element 12 having high thermal conductivity can rapidly dissipating heat in the high-reflection coatings 18. Besides, production costs may then be reduced because high-quality coatings needed for the endurance of high temperature are no longer required.

Therefore, by the design according to the invention, effects for promoting precise positioning during assembly and elevating heat dissipation are achieved.

Apart from the surfaces 14A and 16A having the high-reflection coatings, rest of the surfaces of the prisms 14 and 16 may also be applied with an anti-reflection coating, thereby increasing the intensity of light passing through the prisms.

Figure 4:
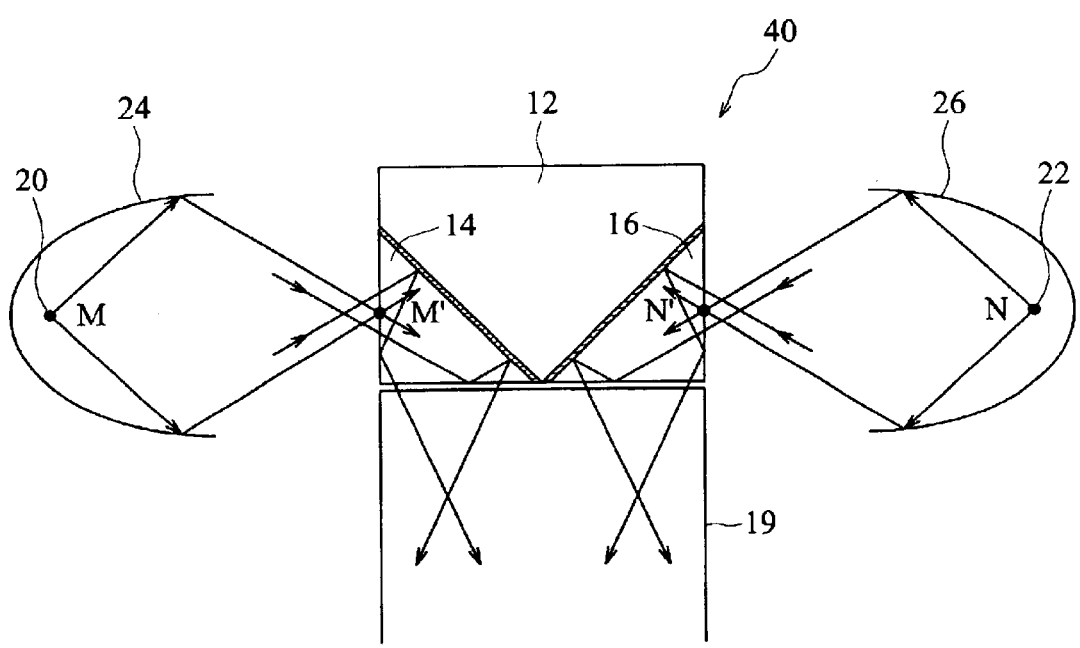
FIG. 4 is a schematic view showing another embodiment of the invention.
Figure 5:
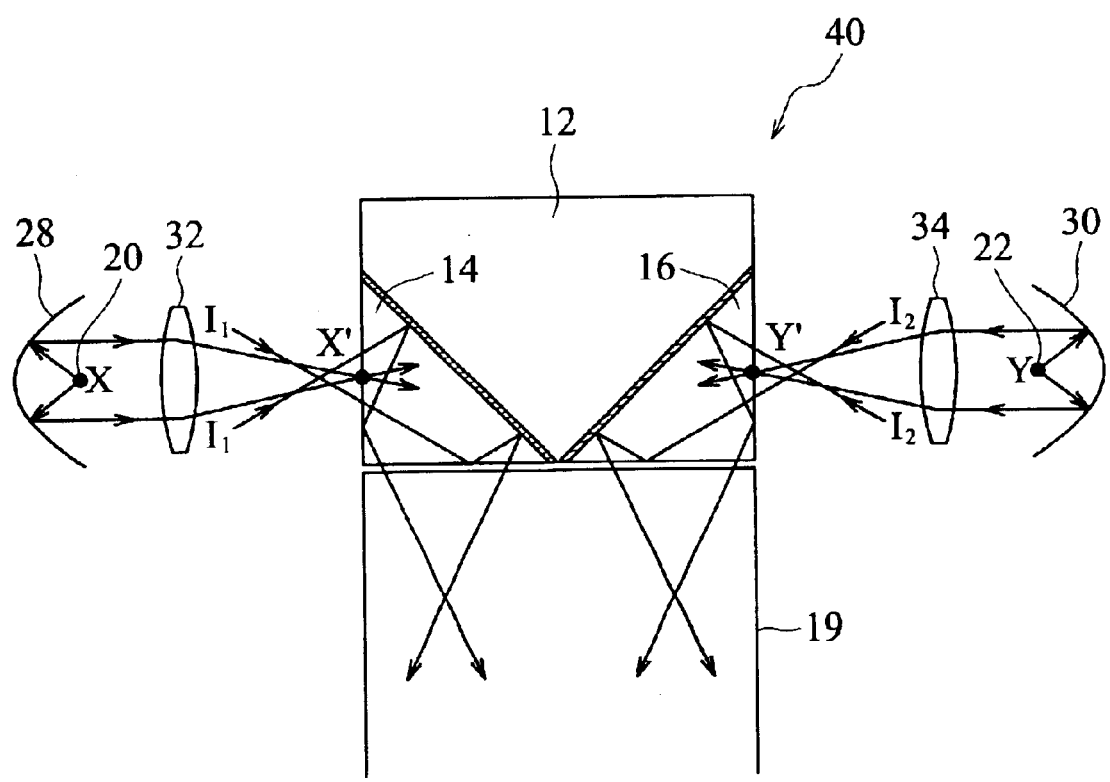
FIG. 5 is a schematic view illustrating a modification of the light condensing device shown in FIG. 4.

FIG. 4 is a schematic view showing another embodiment of the invention. Referring to FIG. 4, partial ellipsoidal reflectors 24 and 26 are positioned on opposite sides of the beam combiner 40, and light sources 20 and 22 are arranged at focal points M and N of the ellipsoidal reflectors 24 and 26, respectively. Based upon the geometric characteristic of an ellipsoid, light emitted from a focus of the ellipsoid passes through another focus of the ellipsoid after having been reflected by the surface of the ellipsoid. Hence, in this embodiment, light emitted from the light sources 20 and 22 shall focus at focuses M' and N' and then enter the prisms 14 and 16. Finally, the light beams emitted from the light sources 20 and 22 are guide to the same direction and outputted to the light guide 19 so as to acquire a beam combining effect. The light condensing device for condensing the light beams emitted from the light sources is including, but not limited to ellipsoidal reflectors. For example, the light condensing device may also be a combination of parabolic reflectors and condensing lenses. Referring to FIG. 5, parabolic reflectors 28 and 30 in coordination with condensing lenses 32 and 34 are disposed at two sides of the prisms. When the light sources 20 and 22 are arranged at focuses X and Y of the parabolic reflectors 28 and 30, respectively, light beams emitted from the light sources 20 and 22 are collimated via the parabolic reflectors 28 and 30, and then pass through the condensing lenses 32 and 34. After that, light beams are focused at points X' and Y' on the prisms 14 and 16 and further enter the prisms. Therefore, a beam combining effect is similarly accomplished.

Moreover, only to ensure that light beams emitted from the light sources and focused to other focal points are to enter the prisms, positions of the ellipsoidal reflectors 24 and 26, and the parabolic reflectors 28 and 30 are not restricted.

Figure 6:
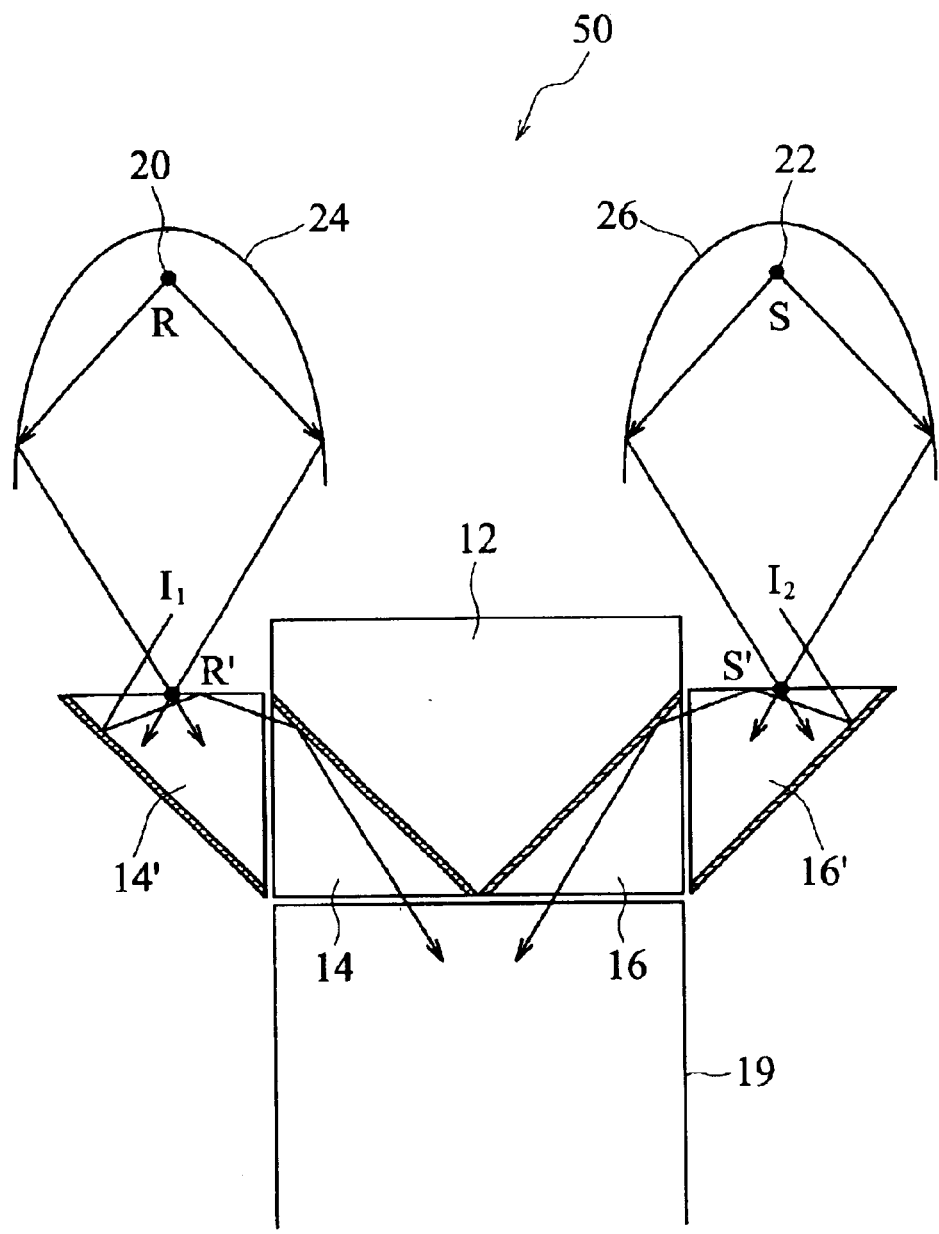
FIG. 6 is a schematic view showing yet another embodiment of the invention.

FIG. 6 is a schematic view showing yet another embodiment of the invention.

Referring to FIG. 6. a beam combiner 50 includes two sets of paired prisms 14,14' and 16,16'. By such prism arrangement, a light condensing device like ellipsoidal reflectors 24 and 26 can be positioned on the same side other than the opposite sides of the beam combiner 50, thereby reducing space occupied by the entire structure of the beam combiner 50.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A beam combiner for guiding input light beams coming from different directions toward the same output direction, comprising:
   a heat-dissipation element, and
   a plurality of prisms, each of the prisms being applied with a high-reflection coating for forming a reflective surface; wherein
   each of the prisms is connected to the heat-dissipation element via the reflective surface.

2. The beam combiner as described in claim 1 further comprising light sources for providing the input light beams.

3. The beam combiner as described in claim 1, wherein the plurality of prisms are rectangular prisms.

4. The beam combiner as described in claim 1, wherein the heat-dissipation element is made of metal.

5. The beam combiner as described in claim 1, wherein rest surfaces of the plurality of prisms apart from the reflective surfaces are applied with anti-reflection coatings.

6. The beam combiner as described in claim 1, wherein the plurality of prisms are connected to the heat-dissipation element by adhering.

7. The beam combiner as described in claim 1, wherein the plurality of prisms form with metal coatings on the reflective surfaces.

8. The beam combiner as described in claim 7, wherein the plurality of prisms are connected to the heat-dissipation element via the meal coatings by soldering or fusing.

9. The beam combiner as described in claim 1 further comprising a light guide for evenly guiding output light beams.

10. The beam combiner as described in claim 9, wherein the light guide is a solid light guide.

11. The beam combiner as described in claim 9, wherein the light guide is a hollow light guide.

12. The beam combiner as described in claim 1 further comprising a light condensing device.

13. The beam combiner as described in claim 12, wherein the light condensing device is ellipsoidal reflectors.

14. The beam combiner as described in claim 12, wherein the light condensing device is combination of parabolic reflectors and condensing lenses.

15. The beam combiner as described in claim 12, wherein the light condensing device is positioned on opposite sides of the beam combiner.

16. The beam combiner as described in claim 12, wherein the light condensing device is deposed on the same side of the beam combiner.

* * * * *